No. 743,220. PATENTED NOV. 3, 1903.
N. S. BARGER.
DISK CULTIVATOR.
APPLICATION FILED MAY 18, 1903.
NO MODEL. 3 SHEETS—SHEET 1.
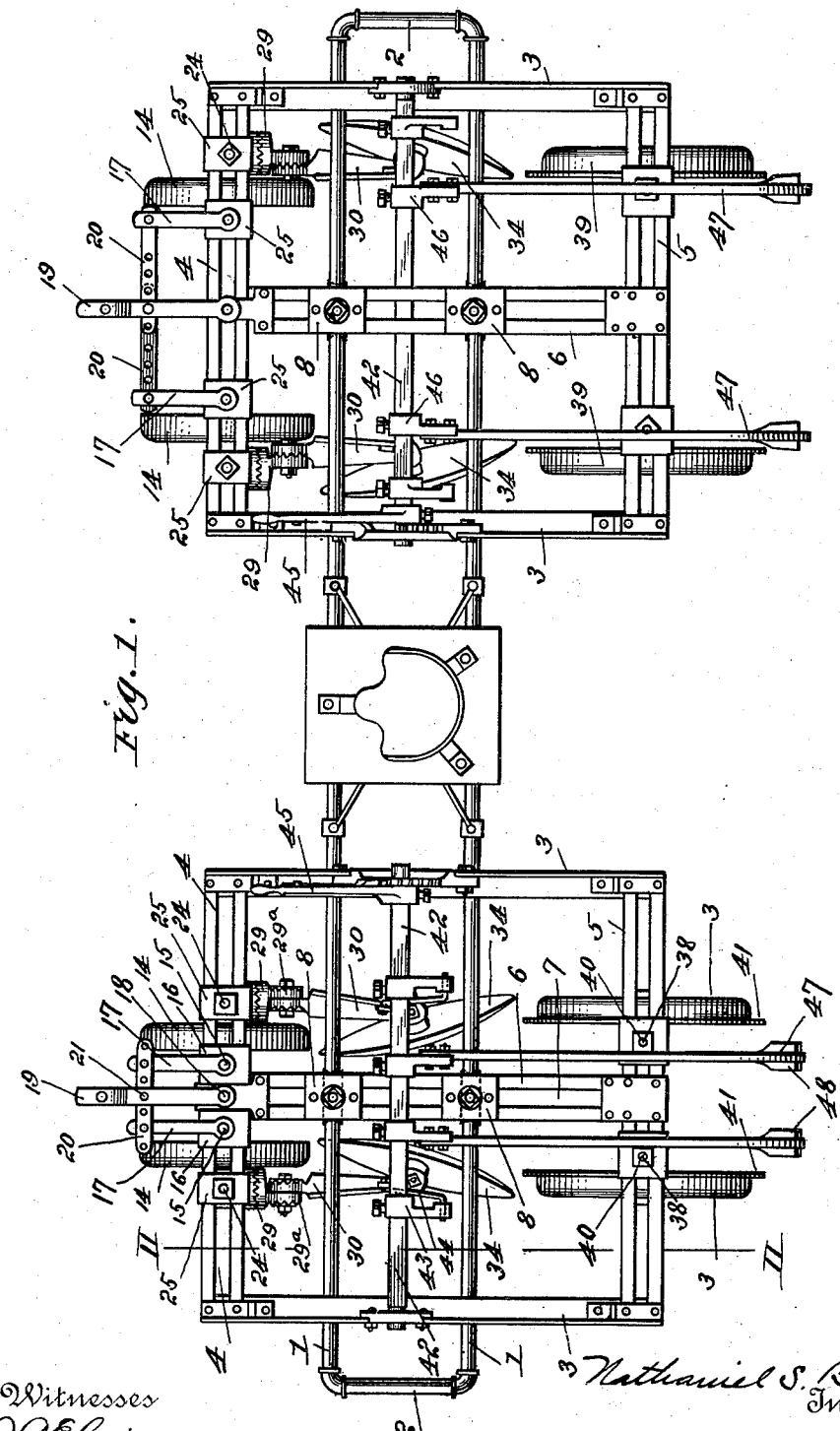

No. 743,220. PATENTED NOV. 3, 1903.
N. S. BARGER.
DISK CULTIVATOR.
APPLICATION FILED MAY 18, 1903.
NO MODEL. 3 SHEETS—SHEET 2.
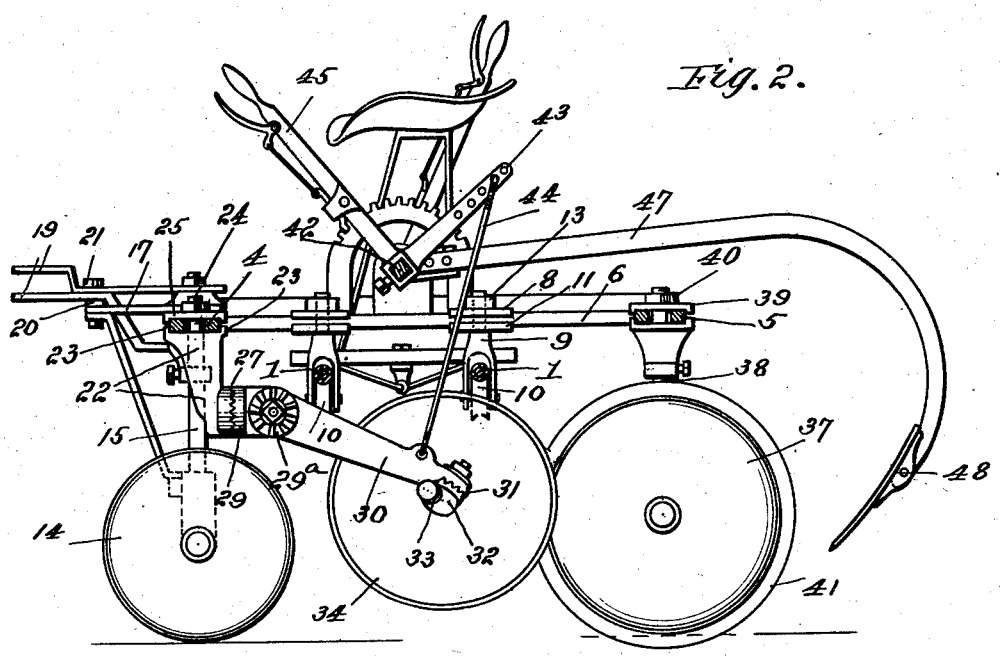
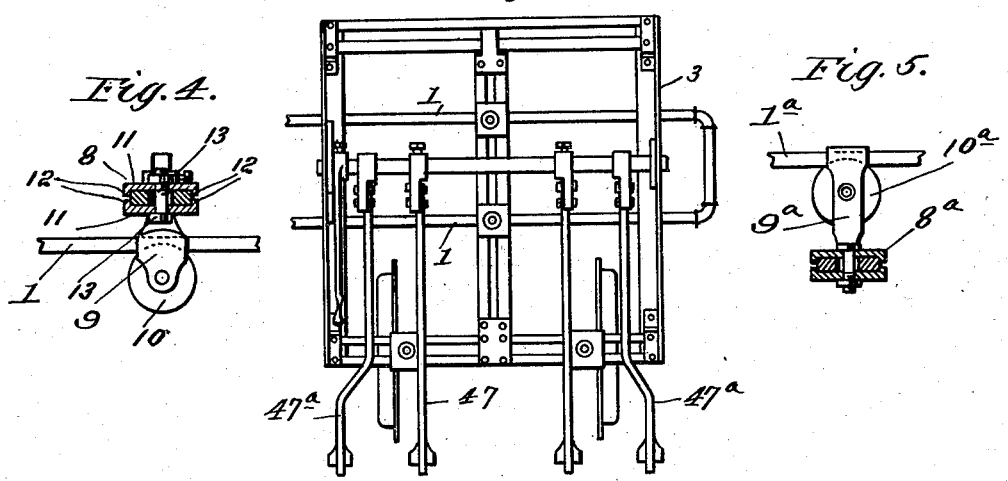

No. 743,220. PATENTED NOV. 3, 1903.
N. S. BARGER.
DISK CULTIVATOR.
APPLICATION FILED MAY 18, 1903.
NO MODEL. 3 SHEETS—SHEET 3.
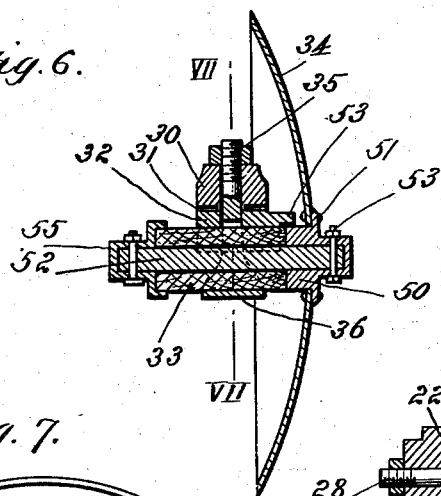
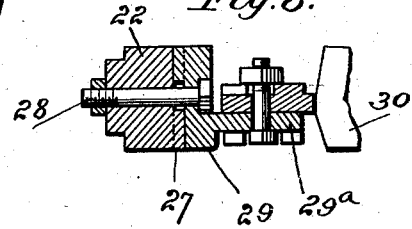
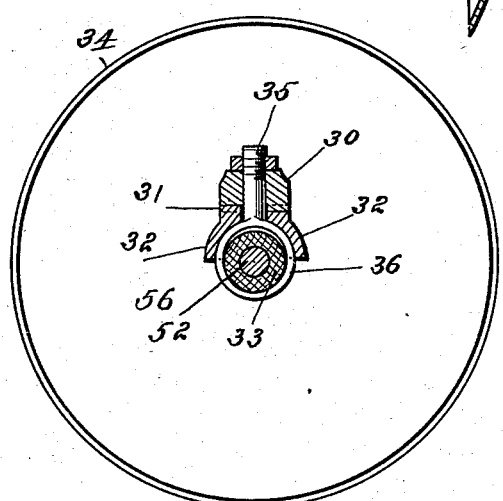
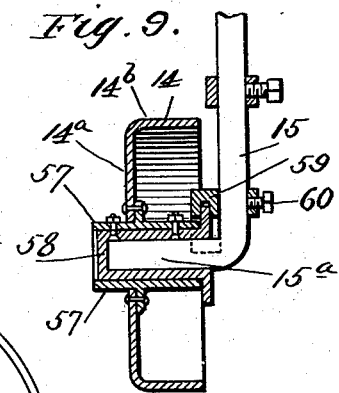
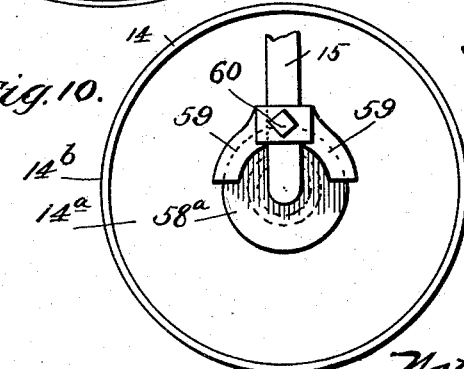
Witnesses
J. A. E. Criswell
R. L. White
Nathaniel S. Barger
Inventor
By his Attorneys Davis & Davis
THE NORRIS PETERS CO., PHOTO-LITHO., WASHINGTON, D. C.

No. 743,220. Patented November 3, 1903.

UNITED STATES PATENT OFFICE.

NATHANIEL S. BARGER, OF ST. JOSEPH, MISSOURI.

DISK CULTIVATOR.

SPECIFICATION forming part of Letters Patent No. 743,220, dated November 3, 1903.

Application filed May 18, 1903. Serial No. 157,567. (No model.)

*To all whom it may concern:*

Be it known that I, NATHANIEL S. BARGER, a citizen of the United States, residing at St. Joseph, in the county of Buchanan, State of Missouri, have invented certain new and useful Improvements in Disk Cultivators, of which the following is a specification, reference being had therein to the accompanying drawings, in which—

Figure 1 is a plan view of the cultivator; Fig. 2, a vertical sectional view taken on the line II II of Fig. 1; Fig. 3, a detail plan view of one section of the cultivator, showing a slightly-different arrangement of the plows; Fig. 4, a detail view of the means for connecting the cultivator-sections to the coupling-frame; Fig. 5, a similar view of a slightly-different form of connecting means; Fig. 6, a detail vertical sectional view of one of the disks and its supporting-bearing; Fig. 7, a vertical sectional view on line VII VII of Fig. 6; Fig. 8, a horizontal sectional view through the lower end of a disk-carrying standard and the connecting-piece; Fig. 9, a vertical sectional view of one of the forward furrow-guiding wheels, and Fig. 10 a detail elevation thereof.

One of the objects of this invention is to provide means for connecting or coupling together the two sections of a two-row disk cultivator or harrow or other like implement in such manner that said coupling shall connect the two sections and yet permit each section to shift independently to accommodate itself to the unevenness of the ground and to further permit said sections to be readily adjusted to the distance between the rows of plants to be cultivated.

Another object of the invention is to provide forward furrow-wheels adapted to travel in the old furrows and corresponding rear furrow-wheels to travel in the new furrows made by the disks and to mount the disks at a point between the two sets of furrow-wheels. By this means any lateral movement of the sections is prevented, said sections being held by the furrow-wheels against such side motion.

Another object of the invention is to provide means whereby the draft will be applied to devices connected to the forward furrow-wheels in such manner that the draft will tend to maintain said wheels in the furrows.

Another object of the invention is to provide an efficient and practically universally adjustable means for mounting the disks.

A further object of the invention is to provide means whereby the disks and shovel-beams of each cultivator-section may be simultaneously raised or lowered.

Other objects and advantages will appear hereinafter.

Referring to the various parts by numerals, 1 designates the coupling-frame, which is formed of two parallel horizontal bars which extend transversely of the machine and are located a suitable distance from each other, their outer ends being connected by the end bars 2. This frame is preferably formed of cylindrical metal tubing, but of course it may be formed of any suitable material. Two cultivator-sections are adjustably connected to this coupling-frame, one of said sections being near each end thereof. Each of these frames is formed with the parallel side bars 3, which are of angle-iron, one member of which is horizontal and extends inward, the other member being vertical. Connecting these horizontal side bars are the forward and rear bars 4 and 5, respectively, these bars being formed of two narrow strips spaced a short distance apart to form a long space or slot between them. These forward and rear bars are connected at a point midway their ends by a central longitudinal bar 6, which is also constructed of two narrow strips spaced apart to form the long slot or space 7 between them. Mounted on this longitudinal bar 6 are two adjustable blocks 8, these blocks being located directly over the transverse bars of the coupling-frames. Rotatably mounted in each of the blocks 8 is a depending hanger 9, which carries at its lower end a grooved roller 10, said grooved roller engaging the lower surface of the adjacent bar of the coupling-frame, the hanger extending over and embracing said bar, so that it is loosely held between the roller and the hanger. By this means the cultivator-sections will be permanently connected to the coupling-frame, while at the same time they may be readily adjusted inward or outward on said frame and will move freely to accommodate the disks or other implements supported thereby to the unevenness of the ground. Each of the blocks 8 is formed of the upper and lower plates 11. These plates have side flanges 12, which engage the edges of the bar 6 and are adjustably held in position by bolts 13.

Instead of arranging the coupling-frame below the cultivator-sections, as shown in Figs. 1 and 2, it may be arranged above said sections, as shown in Fig. 5. In this latter arrangement the guide-roller $10^a$ is mounted in a vertical standard $9^a$, whose lower end is pivotally mounted in the adjustable box $8^a$. This box $8^a$ is secured to the central longitudinal bar 6 of the cultivator-section. In this form of the device it will be noted that the standard $9^a$ projects above the section-frame and that the side bar $1^a$ of the coupling-frame rests on the top of this roller. The upper bar of the standard $9^a$ extends over the bar of the coupling-frame, so that said bar is held in engagement with the guide-roller. It will thus be seen that the cultivator-sections may be readily adjusted in and out—that is, transversely—on the coupling-frame, the connection between the sections and the coupling-frame being a rolling one. It will also be noted that the sections may tilt toward their inner or their outer edges, the points at which the bearing-rollers engage the rods of the coupling-frame being directly in line with each other and at the transverse centers of the sections. By this means the cultivator-disks will be permitted to adjust themselves to the unevenness and inequality in the soil.

In all furrow-following machines the furrow-wheels should be guided by the furrows, and said guidance should be sufficient to overcome any ordinary tendency to deflect said wheels therefrom—such, for instance, as the tendency of the wheels to be deflected from the line of draft by crooked furrows and like causes. Such wheels, however, should be turnable in their mountings upon a vertical pivot when desired to permit the machine to be turned at the ends of the furrows. To attain these objects, I mount on the forward bar of each section two forward furrow-wheels 14, one of said furrow-wheels being on each side of the longitudinal center of the section. Each wheel 14 is journaled on the lower end of a vertical bar 15, which at its upper end is pivotally mounted in a block 16, said block being adjustably mounted on the forward bar of the section-frame. To the upper end of the bar 15, above the block 16, is rigidly secured a forward-extending arm 17. The lower end of the inner bar 15 is bent inward horizontally toward the inner side bar of the section-frame, the lower end of the outer bar 15 being bent outward horizontally toward the outer side bar of the section-frame, and on these horizontal portions $15^a$ the furrow-wheels are journaled. Pivotally mounted on a vertical bolt 18, secured in the forward bar of each section-frame, is a forward-extending draft-bar 19. Pivotally connected to the forward ends of the arm 17 are inward-extending adjustable links 20, said links being formed with a series of perforations by which they are adjustably connected to the draft-bar 19, a bolt 21 passing through said draft-bar and the adjacent perforations of the adjustable links. As the furrow-wheels may be adjusted laterally—that is, along the forward bar of the section-frame—the links 20 may be correspondingly adjusted to maintain the arms 17 parallel with each other and with the central draft-bar 19. The whiffletree or other draft connection may be pivotally mounted in the forward end of the draft-bar.

It will be readily understood that a direct forward draft on the draft-bar 19 will tend to maintain the furrow-wheels in the furrows and will aid very materially in preventing said wheels being deflected from the furrows by reason of any crookedness or unevenness thereof. The two links 20 form an adjustable sway-bar by which when the draft is intentionally deflected the furrow-wheels will be turned and be caused to leave the furrows. It will thus be seen that considerable side draft must be exerted on the draft-bar 19 before the furrow-wheels will be deflected from the furrows by which they are guided, this actually occurring only at the ends of the rows or furrows and when it is desired to turn the machine. As before stated, the furrow-wheels may be adjusted on the forward bar of the section-frame to adapt them to enter the furrows, and the links 20 may be correspondingly adjusted. It will be noted that the furrow-wheels of the right-hand section of the cultivator, as shown in the drawings, are separated a considerable distance, while those of the left-hand section are quite close together.

In that type of disk cultivators in which the disks are attached to the rear edge of the cultivator-frame and extend back or in the rear of the furrow-wheels the disks have considerable ungoverned or uncontrolled side motion or lateral movement, and are therefore altogether uncertain in operation. I completely overcome such objections by my arrangement of disks and furrow-wheels and at the same time provide for the independent adjustment of each disk and each furrow-wheel, whereby the said disks and furrow-wheels may be so located in relation to each other as to secure the best coaction thereof.

To the forward bar of each section-frame are secured two depending disk-carrying standards 22, one of said standards being secured to said bar on each side of the longitudinal center of the section-frame. Each of said standards is formed at its upper edge with the flanges 23, which engage the outer edges of the bar 4 and prevent said standard rotating. Each of said standards is also formed with a central upward-extending threaded projection 24, which extends through the slot of the bar 4. Fitting over the bar 4 is a cap-like plate 25, said plate engaging the side edges of the bar and being firmly secured in place by a nut screwed down on the projection 24. By these means the disk-carrying standards are firmly but adjustably connected to the forward bars of the section-frames. The lower end of each disk-carrying standard is formed on its rear face with a rose-face or circular series of radial serrations 27, through the center of which extends a clamping-bolt 28. Adjustably connected to the standard by means of this bolt is a rearward-extending connecting-piece 29, the forward end of which is formed with serrations to fit the serrations on the standard 22, whereby the two parts will be adjustably connected and the connecting-piece will be prevented from swinging around on the clamping-bolt. One side of the rearward-extending part 29$^a$ of this connecting-piece is formed with a rose-face or series of serrations, and its other side is smooth. Connected to this this part 29$^a$ is a rearward-extending disk-carrying arm 30, whose forward end is formed smooth on one side and serrated on the other to correspond with the serrated end of the part 29$^a$, whereby said disk-carrying arm may be connected to the connecting-piece 29 by a swinging connection or by an adjustable but non-swinging connection, as will be readily understood. The disk-carrying arms of the left-hand section of the cultivator shown in the drawings are connected to the parts 29$^a$, so as to have a swinging connection therewith, the smooth surface of the said arm being clamped to the smooth surface of the connecting-piece, while the disk-carrying arms of the right-hand section of the cultivator are connected to the pieces 29 by an adjustable but non-swinging connection, the serrated faces of said arms being connected to the correspondingly-serrated faces of the parts 29$^a$.

The rear end of each disk-carrying arm, on the under side thereof, is formed with the serrated face 31, with which is adapted to engage the serrated upper face of the yoke 32, whose under surface fits over the journal-box 33 of the cultivator-disk 34. Extending through the lower end of the disk-carrying arm and through the yoke 32 is a clamping-bolt 35, whose lower end is formed into an eye 36, which loosely receives the journal-box, its upper end being threaded to receive a nut, said nut bearing on the upper side of the disk-carrying arm. By this means it will be seen that the disk journal-box 33 will be strongly clamped to the arm 30, the clamping-bolt drawing said box up into the yoke 32 and rigidly clamping the yoke to the lower side of the disk-carrying arm. It will also be readily understood that by means of the intermeshing serrated faces of the disk-carrying arm and the yoke 32 the disk may be adjusted at any desired angle with respect to the line of draft. By means of the adjustable connection between the connecting-piece 29 and the standard 22 the disk may be given any desired inclination with respect to a vertical line, and by means of the adjustable connection between the forward end of the disk-carrying arm and the piece 29 the disk may be given any vertical adjustment desired. The disk-carrying arms are of such length that the disks are supported about midway between the forward and rear bars of the section-frames and below the center of the coupling-frame for a purpose which will appear hereinafter.

On the rear bar of each section-frame are mounted two large furrow-wheels 37, said wheels being journaled on standards 38. These standards are adjustably secured to the bar 5 by means of the boxes 39 and the nut 40. The lower end of each of these standards is bent horizontally to correspond with the bent end of the adjacent standard carrying the forward furrow-wheel, and on these bent ends are journaled the furrow-wheels 37. It will thus be seen that the cultivator-disks of each section are supported between the forward and rear furrow-wheels and that therefore they will be prevented from causing any lateral movement of the cultivator-sections. The rear furrow-wheels are provided on their inner edges with vertical flanges 41, which enter the earth and aid considerably in preventing any lateral movement of the sections. These furrow-wheels 37 are to be adjusted to follow in the furrows made by the cultivator-disks, while the forward furrow-wheels are to be adjusted to follow in the old furrows. It will therefore be seen that the sections will be firmly held against any tendency to move laterally both by the fact that the disks are mounted between the forward and rear furrow-wheels and by the fact that said disks are mounted at about the transverse center of the machine.

With the listing-cultivators now in use the earth is turned out on the ridge—that is, away from the corn—the first time the cultivator is run over the listed corn. The second time over the corn the earth is turned in—that is, on the corn. My invention permits the machine to be so constructed that I can go over the corn twice, turning the ground out, and the third time over I can set the disks to turn the ground in to the corn. The rear furrow-wheels are to be placed in the track of the disks, whether said disks are turning the earth away from the corn or in to the corn, and they are especially effective when going over the corn for the third time to turn the earth inward to the corn, the disks during this latter operation moving the earth a considerable distance, and thereby causing considerable lateral pressure or strain on the cultivator-frames. By placing the rear wheels in the furrow or track of the disks they prevent lateral motion of the frames, taking up the side thrust of the disks.

Mounted in the side bars of each section-frame at about the transverse center of said section is a horizontal rock-shaft 42, to which are secured two upward and rearward extending arms 43, one of these arms being arranged on each side of the longitudinal center of the section. Each arm 43 is connected to the adjacent disk-carrying arm by a rod 44, said rod being adjustable along the arm 43 at the outer end thereof by means of a series of perforations in said arm. These arms are adjustable along the rock-shaft to correspond to the lateral adjustment of the standard 17 and may be rigidly clamped to said rock-shaft by means of suitable clamping-screws. Connected to each rock-shaft, near the inner end thereof, is an upward-extending lever 45, by which the shaft may be rocked, a suitable segment-rack and latch being provided to lock said lever and the rock-shaft in any desired position. By this means it will be readily seen that when the disk-carrying arms are connected to the connecting-pieces 29 by a swinging connection, as shown in the left-hand section of the cultivator, the disks may be raised from the ground by throwing forward the lever 45. When the disk-carrying arms are connected to the connecting-pieces 29 by means of the non-swinging adjustment, as shown in the right-hand section of the cultivator, the rod 44 is disconnected from the disk-carrying arm.

On the rock-shafts 42 between the arm 43 are secured rearward-extending socket-pieces 46, to which are secured the rearward-extending plow-beams 47, said beams at their rear lower ends carrying the plow-shovels 48. The sockets 46 are adjustable along the rock-shafts to secure their proper relative positions with respect to the rear furrow-wheels and to the cultivator-disks and may be securely clamped in position by suitable clamping-screws. The plow-beams extend to a point slightly in the rear of the rear furrow-wheels. It will be noted that the disks and plows of each section of the cultivator may be simultaneously raised when the disks are supported, as shown in the left-hand section of the cultivator. It will also be noted that by mounting the plow-beams on the rock-shaft and supporting the rock-shaft on the cultivator-frame at a point between the forward and rear furrow-wheels the tendency of the plows to shift the cultivator-frame or the furrow-wheels is effectively resisted by the furrow-wheels.

Any suitable form of journal may be employed for supporting the cultivator-disks and the furrow-wheels; but I prefer to employ dust-proof journals, as illustrated in Figs. 6, 7, 9, and 10. The cultivator-disks 34 are each formed with a central aperture, in which is secured the hub 50, which is provided with an outward-extending radial flange 51, to which the cultivator-disk is rigidly secured by riveting or other means. This hub is formed at its center with an inward-extending recess to receive the inner end of a spindle or shaft 52. The inner end of this spindle is secured rigidly in the hub by means of a transverse bolt 53. Fitting closely against the inner face of the hub and receiving the spindle is the wooden journal-box 33, the yoke 32 fitting the upper surface of this box, as previously described. Formed on the inner edge of this yoke is a flange 53, which extends over the joint between the hub and the journal-box and protects said joint, preventing dirt and dust from entering therein. Secured to the outer end of the spindle is a cap 55, which is formed with an inward-extending annular flange 56, which embraces the outer end of the journal-box 32 and prevents dirt and dust entering between the journal and the spindle. It will thus be seen that the spindle will be thoroughly protected and that dirt and dust cannot enter the journal-box.

The furrow-wheels are preferably formed of sheet metal and are provided with one vertical face 14$^a$ and a tread 14$^b$. Through the vertical face of the wheel is formed a central aperture, in which is fitted an open-ended sleeve 57, said sleeve being formed with an outward-extending flange which fits against the inner face of the vertical side of the wheel and is rigidly secured thereto. Within this sleeve and rigidly bolted thereto is a journal-box 58, said box being closed at its outer end and open at its inner end, a radial flange being formed on said box at the inner end thereof. The journal 15$^a$ of the supporting-standard 15 fits within the journal-box, and mounted on the vertical part of the standard is an adjustable dust-cap 59. This dust-cap is formed on its under side with a groove which receives the upper part of the radial flange on the journal-box and not only serves to exclude dust from the journal-box, but also acts as a retaining means by which the furrow-wheel is held upon the journal. This cap may be secured in position by any suitable means, a set-screw 60 being shown in the drawings for this purpose. It is obvious that by simply loosening the set-screw 60 and raising the dust-cap free of the flange of the journal-box the furrow-wheel may be readily removed from its journal.

It is obvious that as many plow-beams as desired may be secured to the rock-shafts 42. In Fig. 3 four are mounted on said shaft, two on each side of each rear furrow-wheel. In this arrangement of the plow-beams those near the side bars of the frame may be bent laterally near their rear ends.

Having thus described my invention, what I claim as new, and desire to secure by Letters Patent, is—

1. A cultivator comprising, a coupling-frame extending transversely of the cultivator and formed with parallel horizontal side bars, a plurality of cultivator-sections, coupling means carried by each section for slidingly connecting said sections to the coupling-frame, said coupling means engaging the side bars of said frame in a vertical plane passing through the longitudinal center of each cultivator-section whereby said sections may rock on the coupling-frame, and means for pivotally mounting the coupling means in each frame.

2. A cultivator comprising, a coupling-frame extending transversely of the cultivator and formed with parallel horizontal side bars, a plurality of cultivator-sections, coupling means carried by each section for slidingly connecting said sections to the coupling-frame, said coupling means engaging the side bars of said frame in a vertical plane passing through the longitudinal center of each cultivator-section whereby said sections may rock on the coupling-frame, means for pivotally mounting the coupling means in each frame at the longitudinal center of said frame.

3. A cultivator comprising, a transverse coupling-frame formed with horizontal parallel side bars, a plurality of cultivator sections or frames, rollers mounted in each frame at the longitudinal center thereof and engaging the side bars of the coupling-frame whereby the cultivator-frame will be slidingly mounted on the coupling-frame, and means for pivotally mounting the rollers in the cultivator-frames.

4. A cultivator comprising, a transverse coupling-frame, a plurality of cultivator-sections, means for slidingly mounting each section on the coupling-frame, and means for longitudinally adjusting the coupling means on the cultivator-sections.

5. A cultivator comprising, a transverse coupling-frame, a plurality of cultivator-sections, rollers carried by each section and adapted to engage the coupling-frame, whereby each section will be independently slidable on the coupling-frame, means for pivotally mounting said rollers in the sections, and means for longitudinally adjusting said rollers in said frames.

6. A cultivator comprising, a supporting-frame, forward furrow-wheels, rear furrow-wheels, and cultivator-disks supported between the forward and rear furrow-wheels and directly in front of the rear furrow-wheels whereby said wheels will travel in the furrows made by the disks.

7. A cultivator comprising, a supporting-frame, laterally-adjustable forward furrow-wheels, laterally-adjustable rear furrow-wheels, and cultivator-disks supported between the forward and rear furrow-wheels and directly in front of the rear furrow-wheels, whereby said wheels will travel in the furrows made by the disks.

8. A cultivator comprising, a supporting-frame, forward furrow-wheel, rear furrow-wheel, and furrow-forming means supported between the rear and forward furrow-wheels and directly in front of the rear furrow-wheel whereby said rear wheel will travel in the furrow made by the furrow-forming means.

9. A cultivator comprising, a supporting-frame, forward furrow-wheels, rear furrow-wheels, cultivating means supported by the frame between the forward and rear furrow-wheels, and directly in front of the rear wheels, whereby said rear wheels will travel in line with the cultivating means, and cultivator means connected to the frame between the forward and rear furrow-wheels and adapted to engage the ground back of the rear furrow-wheels.

10. A cultivator comprising, a supporting-frame, forward furrow-wheels, rear furrow-wheels, cultivating-disks supported by the frame between the forward and rear furrow-wheels, and directly in front of the rear furrow-wheels whereby said wheels will travel in the furrows made by said disks, a rock-shaft mounted on the frame, and means connecting said rock-shaft to the cultivator-disks whereby said disks may be elevated.

11. A cultivator comprising, a supporting-frame, forward furrow-wheels, rear furrow-wheels, cultivator-disks supported thereby between the forward and rear furrow-wheels, and directly in front of the rear furrow-wheels whereby said wheels will travel in the furrows made by said disks, a rock-shaft, plows connected to said rock-shaft, and means connecting said rock-shaft to the disks whereby the plows and disks may be simultaneously elevated.

12. A cultivator comprising, a supporting-frame, cultivator-disks carried thereby, a disk-carrying arm for each disk, means for adjustably connecting the disk to one end of said arm the other end of said arm being formed with smooth and serrated faces, a standard connected to the supporting-frames, and connecting means carried by said standard and provided with smooth and serrated faces corresponding to the smooth and serrated faces of the disk-carrying arm, for the purpose set forth.

13. A cultivator comprising, a supporting-frame, cultivator-disks carried thereby, a disk-carrying arm for each disk, means for adjustably connecting the disk to one end of said arm the other end of said arm being formed with smooth and serrated faces, a standard connected to the supporting-frame for each disk, and formed at its lower end with a serrated face, a rearward-extending connecting-piece rotatably adjustable on the lower end of said standard and formed with a rearward-extending bar having smooth and serrated faces corresponding to the smooth and serrated faces of the disk-carrying arm for the purpose set forth.

14. A cultivator comprising, a supporting-frame, rear furrow-wheels, and cultivator-disks supported by the frame and adapted to contact with the ground in front of said furrow-wheels.

15. A cultivator comprising, a supporting-frame, laterally-adjustable rear furrow-wheels, and laterally-adjustable cultivator-disks supported by the frame and adapted to contact with the ground in front of the rear furrow-wheels.

16. A cultivator, comprising a supporting-frame, forward furrow-wheels, upright pivots mounted in the frame and carrying the forward furrow-wheels, forward-extending arms connected to the said pivots, a draft attachment connected to said forward-extending arms, rear furrow-wheels, and cultivator-disks supported between the forward and rear furrow-wheels, and directly in front of the rear furrow-wheels whereby said wheels will travel in the furrows made by the disks.

17. A cultivator comprising, a supporting-frame, forward furrow-wheels, vertical standards for said wheels, means for pivotally mounting said standards in the frame, a forward-extending arm connected to each of said standards, a cross-bar connecting the forward ends of said arm, a draft attachment connected to said cross-bar, rear furrow-wheels and cultivator-disks supported between the forward and rear furrow-wheels and directly in front of the rear furrow-wheels whereby said wheels will travel in the furrows made by the disks.

18. A cultivator comprising, a supporting-frame, a pair of forward furrow-wheels, vertical standards for said furrow-wheels, means for pivotally mounting said standards in the frame, means for laterally adjusting said standards to vary the distance between the furrow-wheels, a forward-extending arm secured to each of said standards, an adjustable cross-bar connecting the forward ends of said arm, a draft attachment connected to said cross-bar, a pair of rear furrow-wheels, means for laterally adjusting said rear furrow-wheels, and cultivator-disks supported between the forward and rear furrow-wheels and directly in front of the rear furrow-wheels whereby said wheels will travel in the furrows made by the disks and means for laterally adjusting the cultivator-disks.

In testimony whereof I hereunto affix my signature, in the presence of two witnesses, this 12th day of May, 1903.

NATHANIEL S. BARGER.

Witnesses:
CHAS. L. WIEHL,
WILL C. HUYETT.